US007692903B2

(12) United States Patent
Dwyer et al.

(10) Patent No.: US 7,692,903 B2
(45) Date of Patent: *Apr. 6, 2010

(54) APPARATUS AND METHOD FOR CONTROLLING A CIRCUIT BREAKER TRIP DEVICE

(75) Inventors: Sean Dwyer, Rye, NY (US); Henry Hall Mason, Jr., Farmington, CT (US); Cecil Rivers, Jr., Hartford, CT (US); Sohaib Uddin Shaikh, Louisville, KY (US); Craig B. Williams, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/961,608

(22) Filed: Dec. 20, 2007

(65) Prior Publication Data

US 2008/0151463 A1 Jun. 26, 2008

Related U.S. Application Data

(63) Continuation-in-part of application No. 11/614,457, filed on Dec. 21, 2006.

(51) Int. Cl.
*H02H 3/00* (2006.01)

(52) U.S. Cl. .......................................... 361/42; 361/72

(58) Field of Classification Search .................. 361/42, 361/71, 72, 160
See application file for complete search history.

(56) References Cited

U.S. PATENT DOCUMENTS 3,371,252 A 2/1968 James
3,406,295 A 10/1968 Corey
4,449,161 A 5/1984 Kling
4,642,726 A 2/1987 Matsko et al.
4,810,952 A 3/1989 Cohen
4,949,215 A 8/1990 Studtmann et al.
5,120,143 A * 6/1992 Fujiwara et al. .......... 400/157.2
5,268,811 A 12/1993 Maeda
5,377,068 A 12/1994 Kaylor et al.
5,442,515 A 8/1995 Wallaert et al.
5,719,738 A 2/1998 Singer et al.
5,894,398 A 4/1999 Harris et al.
6,060,797 A 5/2000 Harris et al.
6,327,130 B1 12/2001 Durif et al.
6,493,204 B1 12/2002 Glidden et al.

(Continued)

FOREIGN PATENT DOCUMENTS

EP 0623943 A 11/1994

OTHER PUBLICATIONS

Nguyen, Danny, USPTO Office Communication for U.S. Appl. No. 11/961,608, Mail Date Mar. 17, 2009, Washington D.C.

*Primary Examiner*—Danny Nguyen
(74) *Attorney, Agent, or Firm*—GE Global Patent Operation

(57) ABSTRACT

An apparatus and method for controlling the operation of a solenoid in a circuit breaker includes a control circuit configured to receive an activation signal in response to a predetermined condition. The control circuit, in response to said activation signal, provides a first energizing signal to the solenoid for a first predetermined period, and cuts off the first energizing signal for a second predetermined period. The control circuit further provides a second energizing signal to the solenoid for a third predetermined period.

16 Claims, 8 Drawing Sheets

U.S. PATENT DOCUMENTS

| | | | | |
|---|---|---|---|---|
| 6,504,698 | B1 | 1/2003 | Durif et al. | |
| 2002/0056423 | A1 | 5/2002 | Yamaki et al. | |
| 2004/0075963 | A1 * | 4/2004 | Liu et al. | 361/42 |
| 2005/0157444 | A1 | 7/2005 | Ahrendt | |

* cited by examiner

APPARATUS AND METHOD FOR CONTROLLING A CIRCUIT BREAKER TRIP DEVICE

CROSS REFERENCE TO RELATED APPLICATIONS

This application is a continuation-in-part application of U.S. application Ser. No. 11/614,457, filed Dec. 21, 2006, the contents of which are incorporated herein by reference in their entirety.

BACKGROUND OF THE INVENTION

The present invention relates generally to circuit breaker trip systems, and more specifically to an apparatus and method for changing the operative condition of a circuit breaker.

DESCRIPTION OF THE PRIOR ART

Circuit Breakers, and more specifically molded case and air circuit breakers, are well known in the prior art. In general, the function of a circuit breaker is to electrically engage and disengage a selected circuit from an electrical power supply. Circuit breakers are intended to provide protection in electrical circuits and distribution systems against a variety of electrical faults, for example, electrical overload conditions, short-circuit fault currents, as well as ground fault and arcing fault conditions. This protection function is accomplished by separating a pair of electrical contacts for each pole of the circuit breaker.

Typically, each pole of a circuit breaker has an electrical contact supported by a movable contact arm, while a mating contact is held stationary. An operating mechanism, typically in cooperation with a user-operated handle, moves the contact arm such that the movable contact is brought into physical latched engagement with the stationary contact (i.e., to a “closed” ON position), and alternatively separated from the stationary contact (i.e., to an “open” OFF position). The operating mechanisms used to open and close the contacts of many prior art circuit breakers have also been coupled to a motor configured for remote operation.

Additionally, a tripping mechanism, responsive to an electrical overload or fault condition in the circuit protected by the circuit breaker, is used to rapidly release the mechanical latching of the operating mechanism and separate the contacts to a “tripped” OFF position.

The tripping mechanism for the circuit breaker usually includes a thermal overload release responsive to electrical currents moderately above the circuit breaker rating to provide a delayed trip of the circuit breaker contacts. The thermal overload release typically includes a bimetal element that deflects in response to heating caused by the electrical current through the conducting path of the circuit breaker. In the event of an overload current, the bimetal is configured to deflect such that it causes the tripping mechanism to activate and separate the contacts of the circuit breaker to the “tripped” OFF position In the event of current levels in the protected circuit above the normal operating level of the thermal overload release, for example due to a short-circuit in the protected circuit, it is desirable to trip the circuit breaker without intentional delay. Prior art circuit breakers have generally used a variety of electromagnetic trip units moveable in response to magnetic effects of high level fault currents and configured to trigger the tripping mechanism to rapidly separate the contacts of the circuit breaker to the “tripped” OFF position.

In addition, prior art circuit beakers have also directly sensed the current level, for example via current transformer devices, and provided an indication of the magnitude of the sensed current to an electronic trip unit logic circuit. In response to a predetermined condition such as a high level current fault detected in the protected circuit, the trip unit provides a trip signal to trigger the tripping mechanism to activate and separate the contacts of the circuit breaker to the “tripped” OFF position. The sensing current transformers of conventional circuit breakers often provide sufficient power to operate the trip unit. Many prior art circuit breaker electronic trip units are configured to operate using power taken directly from the protected circuit, for example by connecting between a circuit breaker stab connection to the protected circuit and a ground lead “pigtail” cable. Other circuit breaker trip units have alternatively used stored energy devices such as batteries to provide electrical power.

Conventional circuit breakers often additionally provide protection against ground faults. A ground fault trip unit is typically provided which includes an electronic circuit to detect faults between the line conductor and ground and the neutral conductor and ground. Line to ground faults are commonly detected by the use of a differential transformer. The line and neutral conductors are passed through the coil such that when a line to ground fault exists, it creates an imbalance between the two currents in the two conductors which is level detected. As is known, a neutral to ground fault may be detected by injecting a signal onto the neutral conductor which will produce an oscillation if feedback is provided. In response to a ground fault detected in the protected circuit, the ground fault trip unit provides a trip signal to trigger the tripping mechanism to activate and separate the contacts of the circuit breaker to the “tripped” OFF position In addition, conventional circuit breakers often include mechanisms designed to protect against arcing faults. Arcing faults are intermittent high impedance faults caused for instance by worn insulation, loose connections, broken conductors, and the like. Because of their intermittent and high impedance nature, arcing faults do not always generate currents of sufficient instantaneous magnitude or sufficient average current to trigger the conventional overcurrent trip units. Consequently, separate electrical circuits have been developed for responding to arcing faults from line to ground, line to neutral, and line to line. Arc fault circuit breakers typically use a differential transformer to measure arcing from line to ground. Detecting arcing from line to neutral or from line to line is generally accomplished by detecting rapid changes in load current by measuring voltage drop across a relatively constant resistance, usually a bi-metal resistor. In response to an arcing fault detected in the protected circuit, the arc fault trip unit provides a trip signal to trigger the tripping mechanism to separate the contacts of the circuit breaker to the “tripped” OFF position Whenever conventional circuit breaker trip units are employed, sufficient trip force must be provided to overcome the mechanical latching forces that exist within the circuit breaker operating and tripping mechanisms. To overcome these latching forces, a powerful trip force is usually supplied by an electromechanical solenoid transducer device.

Such electromechanical solenoids used to trip prior art circuit breakers typically consist of an electromagnetically inductive coil wound around a movable ferromagnetic core or armature. The coil is configured to allow linear motion of the armature in response to an applied energizing signal in order to apply a mechanical force to trigger the circuit breaker tripping mechanism resulting in separation of the contacts of the circuit breaker to the “tripped” OFF position. In response to a predetermined condition in the protected circuit, the trip unit provides an energizing signal to the solenoid. A biasing spring is typically provided to reset the solenoid armature to its original position when the energizing signal is removed.

In a typical application, the separation of the circuit breaker contacts to the “tripped” OFF position cuts off the sensed current in the protected circuit, thus causing the trip unit to likewise remove the energizing signal to the solenoid. In the absence of the applied energizing signal, the solenoid is deenergized and reset to its original position.

Conventional circuit breaker trip units are also commonly used to trigger the tripping mechanism to separate the contacts of the circuit breaker to the “tripped” OFF position without the detection of an overcurrent or arcing fault condition in the protected circuit. In such cases, a variety of additional selective accessory devices such as shunt trips, under voltage releases (UVR), remote operators, test switches and other switch devices are used to provide a trip signal to trigger the tripping mechanism to separate the contacts of the circuit breaker to the “tripped” OFF position. The trip signal from the accessory switch device is typically provided to the trip unit to trigger the trip mechanism. In some circuit breakers, a trip signal from an accessory switch device is provided to directly energize and actuate the trip solenoid to separate the contacts of the circuit breaker to the “tripped” OFF position For example, many conventional circuit breakers include a user operable “push to test” switch device to verify the circuit breaker trip system is operational and would function properly in the event of a fault detected in the protected circuit. The switch, when actuated, typically provides a signal to the trip unit to trigger the circuit breaker tripping mechanism to separate the contacts of the circuit breaker to the “tripped” OFF position without regard to the condition of the protected circuit.

In some cases, when conventional circuit breakers employ an electromechanical solenoid to trigger the tripping mechanism, the energizing signal to the electromechanical solenoid can be maintained for an extended period causing excessive heat to develop in the solenoid. For example, this is often due to an undesirable mechanical delay in the operation of the circuit breaker trip mechanism. In such cases of maintained energizing signal, the solenoid can be damaged from overheating due to extended current flow.

One way to avoid such overheating of a circuit breaker trip solenoid would be to use a larger more robust solenoid device. However, this adds additional cost and requires more physical space than may be available.

Another way the problem of circuit breaker trip solenoid overheating has been addressed has been to employ a control circuit for the solenoid that is configured to cut off the energizing signal to the solenoid after a predetermined time. For example, a monostable multivibrator is used to supply an electrical signal to the solenoid upon receipt of a trip signal from the electronic trip unit. The duration of the monostable multivibrator output pulse is controlled to be sufficiently long enough to properly energize the solenoid but short enough to avoid overheating in most instances. Such methods protect the solenoid but are not capable of overcoming an inadvertent delay in the circuit breaker trip operation to protect the circuit, because the solenoid energizing signal is automatically cut off after the predetermined time period without regard to the operative condition of the circuit breaker contacts.

In view of the foregoing considerations, there is a need to provide an apparatus and method to control a circuit breaker trip solenoid that protects the circuit breaker solenoid from overheating, and is further capable of overcoming a delay in trip operation by automatically re-energizing the solenoid for one or more predetermined periods until the desired circuit breaker trip operation is effected.

The present invention will be apparent to those skilled in this art from the following detailed description of a preferred embodiment of the invention.

BRIEF SUMMARY OF THE INVENTION

In one aspect of the present invention, an apparatus and method for controlling the operation of a circuit breaker trip solenoid includes a control circuit configured to receive a trip activation signal in response to a predetermined condition. The control circuit, in response to said activation signal, provides a first energizing signal to the trip solenoid for a first predetermined period, and cuts off the first energizing signal for a second predetermined period. The control circuit further provides a second energizing signal to the trip solenoid for a third predetermined period.

In another embodiment, a method for controlling the operation of a circuit breaker trip solenoid includes sensing an activation signal indicative of a predetermined condition; providing a first energizing signal to the trip solenoid; cutting off the first solenoid energizing signal after a first predetermined period, for a second predetermined period; providing a second solenoid activation signal to said trip solenoid after said second predetermined period; and maintaining the second solenoid activation signal for a third predetermined period.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
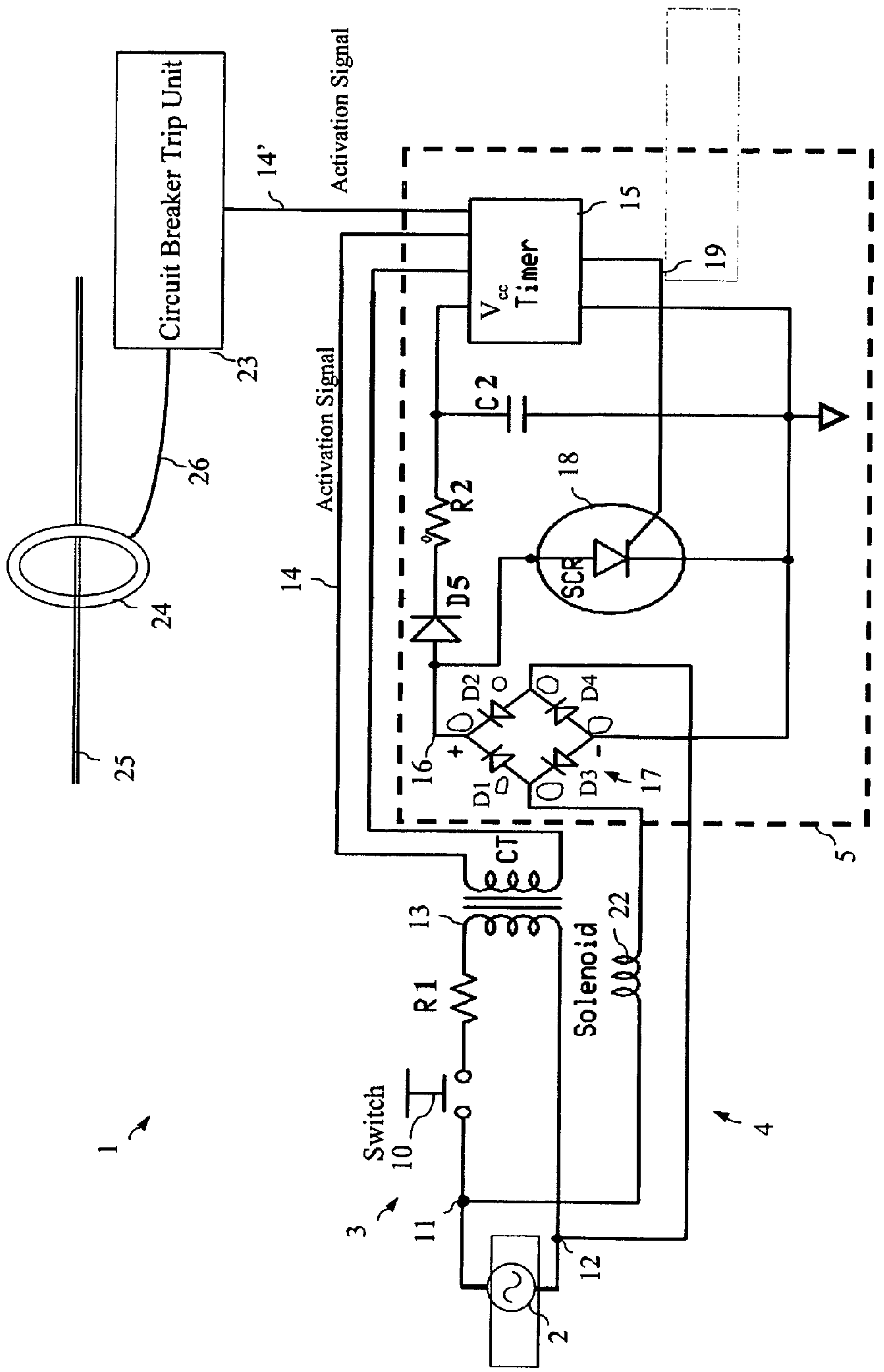
FIG. 1 depicts a schematic representation of an exemplary apparatus for controlling the operation of a circuit breaker trip solenoid in accordance with an embodiment of the invention.
Figure 2:
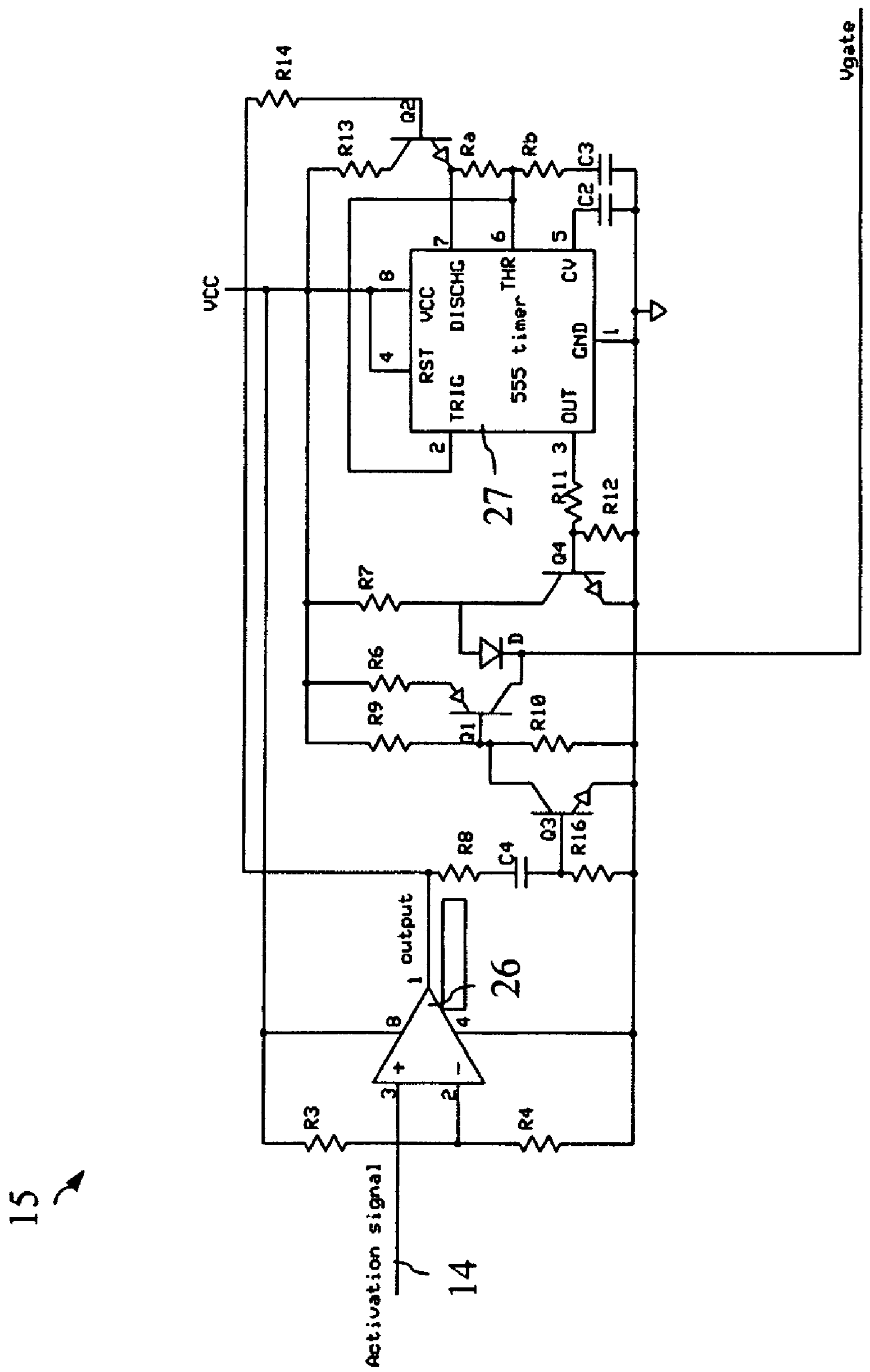
FIG. 2 depicts a schematic representation of an exemplary apparatus for a timer as used in controlling the operation of a circuit breaker trip solenoid in accordance with an embodiment of the invention.
Figure 3:
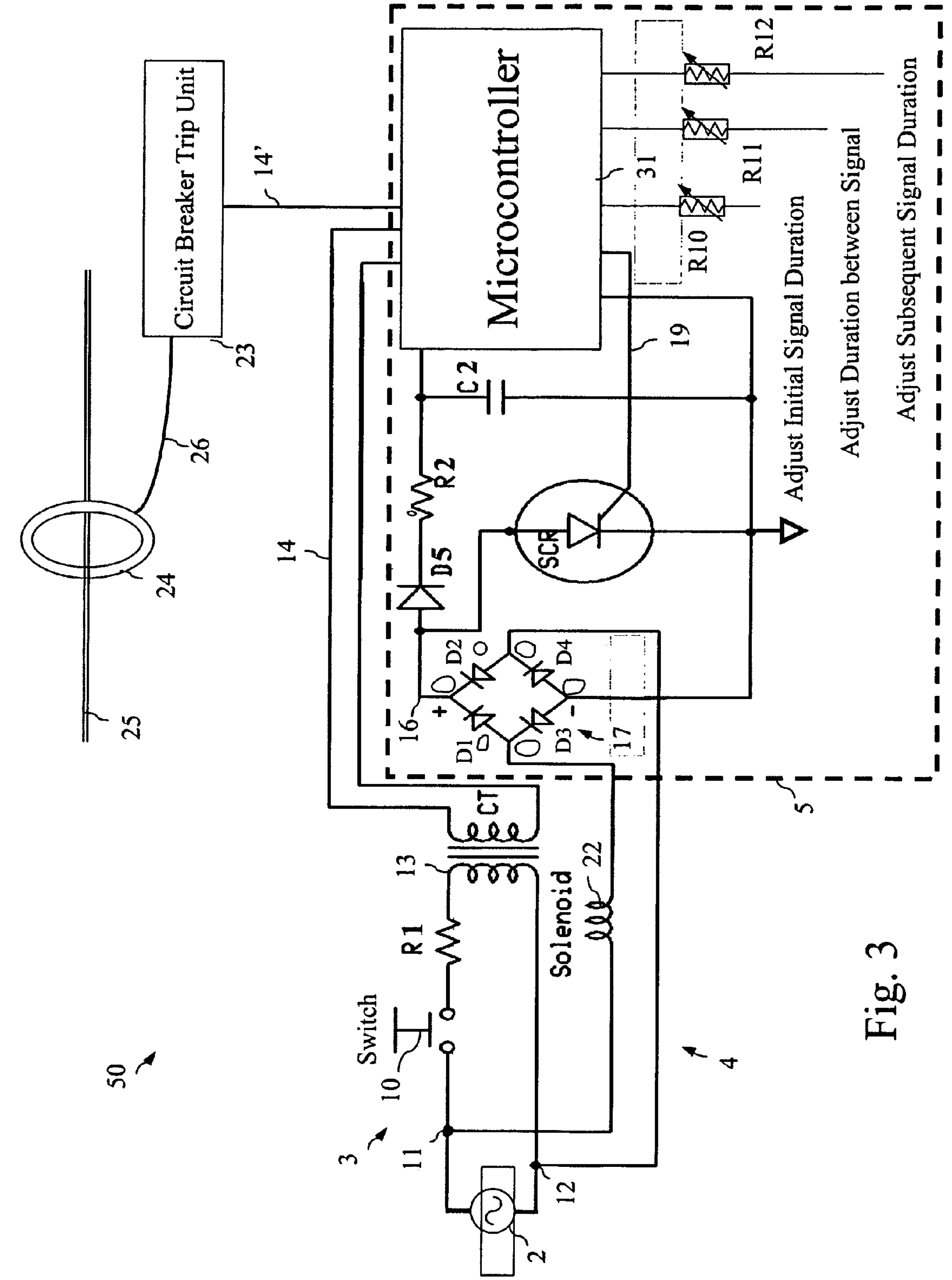
FIG. 3 depicts a schematic representation of an alternative exemplary apparatus for controlling the operation of a circuit breaker trip solenoid in accordance with an embodiment of the invention using a microcontroller to perform the timing and logic functions.
Figure 7:
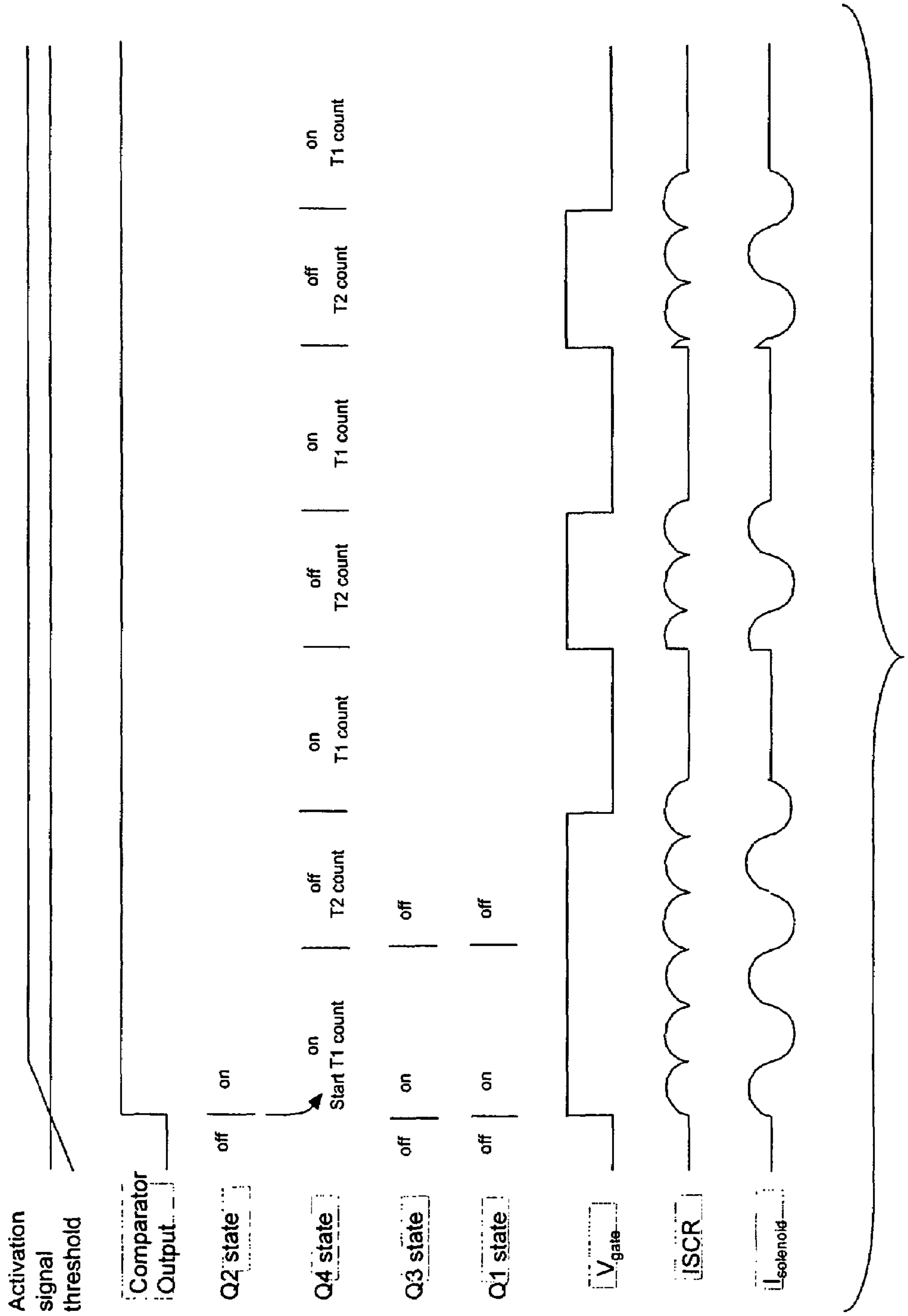
FIG. 7 depicts various waveforms associated with the apparatus embodiments of FIGS. 1, 2, and 3.

A schematic of the apparatus for controlling the operation of a circuit breaker trip solenoid in accordance with the present invention is generally illustrated in FIG. 1, FIG. 2, and FIG. 3. As these embodiments of the present invention are described, reference should also be made to FIG. 7 as necessary, as a depiction of various waveforms associated with the described apparatus is provided.

Referring initially to FIG. 1, an exemplary solenoid control system 1 is depicted. As shown, an external AC source 2 provides power to an activation signal control path 3 and a solenoid circuit path 4. Both the activation signal control path 3 and the solenoid circuit path 4 are in signal communication with a solenoid control unit 5. As is further depicted, the solenoid control unit 5 includes a full wave bridge rectifier 17, a filtering diode D5, a current limiting resistor R2, a smoothing capacitor C2, a timer 15, and a silicon controlled rectifier (SCR) or other suitable solid state switching device 18 (e.g., MOSFET (metal oxide semiconductor field effect transistor), TRIAC (triode for alternating current) or other transistor device).

In operation of the control system 1, an AC electrical signal is provided from the external AC source 2 at terminals 11 and 12. For the first half of the cycle, the AC signal at terminal 11 is passed through a solenoid 22 (included within the solenoid circuit path 4), through diode D1 of bridge rectifier 17, and to an output terminal 16 of the full wave bridge rectifier 17. For the second half of the cycle, the AC signal at terminal 12 is passed through diode D2 of rectifier 17 to output terminal 16 of full wave bridge rectifier 17. The rectified signal at output terminal 16 is then provided to a filtering circuit comprising diode D5, series current limiting resistor R2, and smoothing capacitor C2. The signal from the filtering circuit is passed to the timer 15 in order to provide input power $V_{cc}$ thereto. The resistance value of series resistor R2 is selected to provided sufficient impedance to limit the current through solenoid 22 below its actuation current level until the timer 15 provides a solenoid energization signal, as described in more detail below.

An external sensing unit 24, such as a current transformer (CT) or other suitable sensor, is in signal communication with an external electronic trip unit 23. The electronic trip unit 23 is in signal communication with the solenoid control unit 5. An output signal 26 from the sensing unit 24 indicative of a predetermined condition such as an electrical fault, is provided to the electronic trip unit 23. In response to the output signal 26 from the sensing unit 24, the trip unit 23 provides an activation signal 14' to the solenoid control unit 5. It will be understood by those of skill in the art that various sensing devices and circuit breaker trip units (e.g., incorporating various devices, protection arrangements and logic circuits) may optionally be utilized without departing from the scope of the invention. It will be further understood that an activation signal 14 provided by an accessory switch 10, described in more detail below, may be provided in lieu of, or in addition to, the activation signal 14' from the trip unit 23.

Additionally, a switch 10, such as a pushbutton, may be included within the activation signal control path 3 and disposed between terminal 11 and a current limiting resistor R1 (also within the activation signal control path 3). When the switch 10 is closed, an electrical signal from the AC source 2 is sent through current limiting resistor R1, and across the primary windings of a current transformer 13 included within the activation signal control path 3. An activation signal 14 is thereby induced on the secondary windings of current transformer 13, and provided to start the timer 15. It will be understood that the activation signal 14' from the trip unit 23, may be provided in lieu of, or in addition to, an activation signal 14 provided by the accessory switch 10.

An output energizing signal 19 from timer 15 is provided to the gate of SCR 18, thereby biasing it closed and in the conduction state. During the first half of the AC cycle, the current at the cathode of SCR 18 then flows through diode D4 of full wave bridge rectifier 17, and through the windings of solenoid 22, thus increasing current flow through the solenoid 22 sufficiently to energize the windings and to actuate a plunger (not shown) associated with the solenoid 22. For the second half of the AC cycle, the current at the cathode of SCR 18 flows through diode D3 of full wave bridge rectifier 17 and to the terminal 12. During the period the SCR 18 is in the conduction state allowing current to flow from the output terminal 16 of the rectifier 17 through the SCR 18, the capacitor C2 discharges, providing continued input signal to timer 15 for a duration depending on the chosen value of the capacitor C2.

It will be understood by those of skill in the art that various signal processing techniques (e.g., such as level conversion and filtering of the activation signal to enhance the overall circuit performance) may optionally be utilized in conjunction with the timer circuit, without departing from the scope of the invention. For example, the activation signal to timer 15 may be latched or maintained until the SCR 18 has been placed in the conduction state allowing current to flow from the output terminal 16 of the rectifier 17 through the SCR 18, diode D4 of full wave bridge rectifier 17, and through the windings of solenoid 22, thus increasing current flow through the solenoid 22 sufficiently to energize the windings and to actuate the solenoid 22 plunger. This ensures if the activation signal is noisy or not maintained for a sufficient period to enable the timer 15 to output an energization signal to the solenoid, the initial activation signal will be latched “ON” to the timer to ensure operation. This can be accomplished by using a simple flip-flop type circuit (not shown) to function as a latch. The latch (not shown) will reset when the capacitor C2 discharges.

Referring again to FIG. 1, during normal operation, the SCR 18 will remain in a conducting state until the energization signal 19 to SCR 18 gate is shut off by the timer 15. When the switch 10 is released or placed in the “open” state, the activation signal 14 to the timer 15 is shut off, resetting the timer and cutting off the energization signal 19 from the timer 15 to the gate of SCR 18 and thereby cutting current to flow from the output terminal 16 of the rectifier 17 through SCR 18, thus decreasing current flow through the windings of solenoid 22 sufficiently to deactivate or reset the solenoid 22 plunger.

However, if the activation signal 14 is maintained beyond a predetermined period, the timer 15 will cut off the energization signal 19 to the gate of SCR 18. The timer 15 will then hold the gate of SCR 18 in an “open” or non-conducting state for a predetermined period by continuing to cut off the energization signal 19 for that predetermined period.

At the end of the predetermined non-energization or delay period, if an activation signal 14 remains provided to the timer 15, the timer 15 will reset and an output energizing signal 19 from timer 15 is provided to the gate of SCR 18, thereby biasing it closed and in the conduction state allowing current to again flow from the output terminal 16 of the rectifier 17, through the SCR 18, and diode D4 of full wave bridge rectifier 17 thus increasing current flow sufficiently to energize the windings of solenoid 22 to actuate the solenoid 22 plunger.

The timer 15 circuit may be implemented using various circuit components and configurations. Having described the timer operation in a general way, a description of a particular implementation thereof will be described by way of example in FIG. 2.

Referring now to FIG. 2, a schematic of an exemplary timer circuit 15 is shown. To provide a clean input to the timer 15, the input activation signal 14 is provided to a comparator 26, with input resistors R3 and R4 values chosen to set the threshold for the output signal from comparator 26.

Under normal conditions, when no activation signal is present, and timer 27 is not triggered or in the OFF state, there is no output signal from comparator 26 to resistors R8, R16 and capacitor C4, and therefore transistor Q3 remains in a non-conducting, or OFF state. With Q3 OFF, the input voltage, $V_{cc}$ to timer 15 allows current to flow through resistors R9 and R10 such that the voltage on the base of Q1 is greater than at the emitter thereof so the PNP transistor Q remains in a non-conducting, or OFF state.

With no activation signal 14 present, and no output signal from comparator 26, the voltage at the base of Q2 is less than $V_{be}$, and Q2 remains in a non-conducting, or OFF state and therefore no current flows through R13, Ra, Rb, or C3 and the timer 27 does not operate.

However, the normal operation of the timer 27 is such that an output signal at Pin 3 of timer 27 will be provided to transistor Q4 until the timer 27 turns ON. The voltage divider resistors R11 and R12 provide greater than base-emitter voltage ($V_{be}$) on the base of transistor Q4, putting transistor Q4 in a conducting, or ON condition. Transistor Q4 conducts current through resistor R7, holding the voltage at R7 and diode D to $V_{ce}$, hence no current flows through diode D and the voltage signal output of timer 15, remains low, or essentially at zero volts.

When an activation signal is provided on pin 3 of the comparator 26 that is higher than the voltage on pin 2 of the comparator 26 across dividing resistors R3 and R4, an output signal from the comparator 26 is provided to R8, C4, and R16, putting Q3 in a conducting, or ON state, thus enabling current through resistor R9. This pulls the base voltage of transistor Q1 down to the $V_{ce}$ of transistor Q3 (low) and puts transistor Q1 in a conducting, or ON condition. Transistor Q1 on current flows through resistor R6 to the output of timer 15 ($V_{gate}$) providing an output energization signal from the timer 15.

Additionally, when an activation signal 14 is provided on pin 3 of the comparator 26 that is higher than the voltage on pin 2 of the comparator 26 across dividing resistors R3 and R4, an output signal from the comparator 26 is provided to resistor R14, putting transistor Q2 in a conducting, or ON condition, enabling current flow through resistors R13, Ra, Rb, capacitor C3 and triggers the timer 27 to begin the timing cycle through an input signal to Pin 2 of timer 27.

The integrated circuit timer 27 is configured as an a stable multivibrator which provides an output as a series of pulses, with an adjustable duration between the pulses. The timer 27 output "ON" and "OFF" times are adjusted by selection of the values of Resistors Ra and Rb and capacitor C3. The duration of the timer 27 "ON" time is given by:

$$T_{on}=0.693(Ra+Rb)\times C3.$$

The duration of the timer 27 "OFF" time is given by:

$$T_{off}=0.693(Rb)\times C3.$$

When timer 27 turns on, the output signal at pin 3 of timer 27 is cut off. This effectively grounds resistor R11 and drops the voltage on the base of transistor Q4 below $V_{be}$, putting transistor Q4 in a non-conducting, or OFF state. With transistor Q4 effectively OFF, current flows from timer 15 input $V_{cc}$ through resistor R7 and diode D to continue to provide an output energization signal ($V_{gate}$) from timer 15.

During the period of timer 27 "ON" time ($T_{on}$) as calculated above based on the values of resistors Ra and Rb and capacitor C3, the voltage on the base of transistor Q3 will drop below $V_{be}$ due to the C4, R16 time constant and place transistor Q3 in a non-conducting, or OFF state. With transistor Q3 non-conducting, the voltage divider of resistors R9, R10 also places transistor Q1 in a non-conducting, or OFF state. At the end of timer 27 "ON" time ($T_{on}$), the timer 27 again provides an output signal at pin 3 of timer 27 putting transistor Q4 in a conducting, or ON condition, enabling current flow through resistor R7 to ground cutting off the output signal ($V_{gate}$) from timer 15 for a duration of "OFF" time ($T_{off}$) as calculated above based on the values of resistors Ra and Rb and capacitor C3.

At the end of timer 15 "OFF" time ($T_{off}$), the timer 27 automatically provides again the output signal at pin 3 of timer 2. This again places transistor Q4 in a non-conducting, or OFF state and current flows from timer 15 input $V_{cc}$ through resistor R7 and diode D to continue to provide an output energization signal ($V_{gate}$) from timer 15 as before.

The cycle of providing an output energization signal 19 ($V_{gate}$) from timer 15 for a predetermined period in response to an activation signal, and cutting off the output signal 19 ($V_{gate}$) from timer 15 for a predetermined duration and will repeat as long as activation signal is above the threshold and $V_{cc}$ is adequate to power the circuit.

It will be understood by those skilled in the art that the duration of the output energization signals ($V_{gate}$) and the duration of the OFF time between output energization signals, may be made adjustable in the field through the use of variable resistors and capacitors in the above described circuit.

Referring now to FIG. 3, an alternative embodiment of a solenoid control system 50 is shown that is identical to that of FIG. 1, except that the timer circuit 15 of FIG. 1 is replaced by a programmable microcontroller 31 that includes internal timers and switches. The microcontroller 31 may additionally be provided with user adjustable input signals such as through adjustable resistors (varistors) R10, R11, and R12 to enable adjustment of the duration of the initial and subsequent energizing signals and the "OFF" time between signals. It will be understood by those of skill in the art that as an alternative to varistors R10, R11, and R12, many other devices or circuits may also be used to enable a user to provide an adjustable input to the microcontroller 31 to enable adjustment of the duration of the initial and subsequent energizing signals and the "OFF" time between signals. The microcontroller 31 is programmed to respond to the received activation signal by providing an energizing signal 19 to switching device 18 (e.g., SCR) to energize the solenoid 22 for a predetermined period and cut off the energizing signal 19 to the solenoid 22 for a second predetermined period, and if the activation signal is maintained, reapply the energizing signal 19 to the solenoid for a third predetermined period. The microcontroller 31 is also programmed to cut off the energization signal 19 if the input activation signal 14 is shut off.

It will be appreciated that the logic steps used to perform the timing and switching functions for the operation of the present invention embodiments are readily programmable for execution by a microcontroller. It will be further appreciated that each defined energizing signal-OFF or energizing signal-ON period need not be identical, but may instead be programmed or adjusted as desired by the user.

Figure 4:
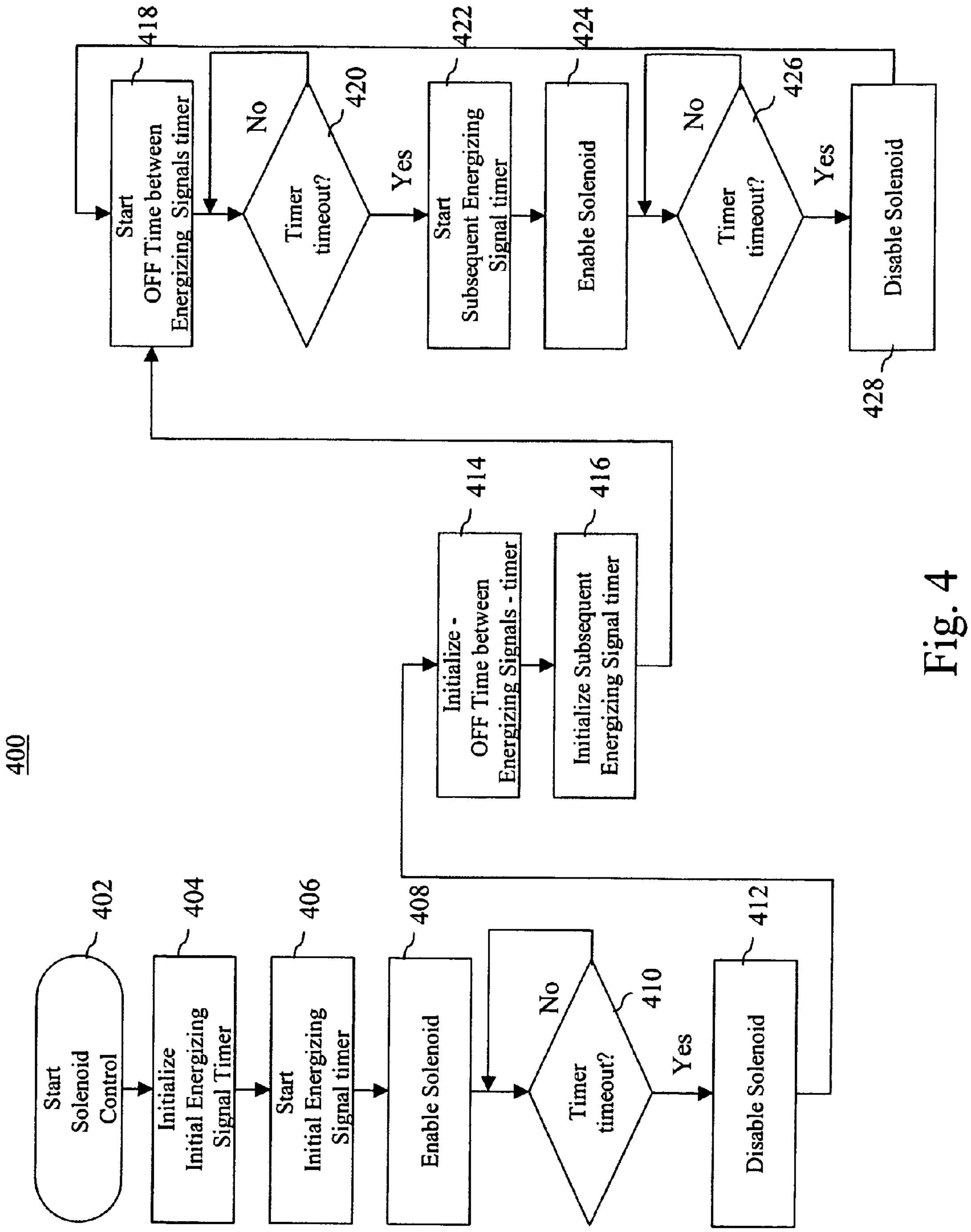
FIG. 4 depicts a logic flow for a microcontroller to perform the timing and logic functions in accordance with an embodiment of the invention.

Referring now to FIG. 4, a flow chart representation of an exemplary algorithm 400 as implemented by, for example, the programmable microcontroller 31 of FIG. 3 is shown.

The microcontroller starts the solenoid control algorithm at block 402 when the activation signal is provided to the microcontroller. The microcontroller initializes and starts an initial energizing signal timer at blocks 404 and 406, respectively, and provides an energizing signal output to enable the solenoid as shown at block 408. The output energization signal will be maintained until the initial energizing signal timer has timed out. As shown in decision block 410, if the microcontroller initial energizing timer has timed out, the energization signal will be cut off to disable the solenoid at block 412.

The microcontroller will then initialize both an energizing signal-OFF timer at block 414 and a timer for subsequent energizing signals-ON at block 416. Next, the energizing signal-OFF timer is started at block 418 and the output energization signal is cut off until the energizing signal-OFF timer has timed out. If the microcontroller 31 energizing signal-OFF timer has timed out, as determined in decision block 420, the subsequent energizing signals-ON timer is started at block 422 and the microcontroller provides an energizing signal output to re-enable the solenoid at block 424. If the microcontroller subsequent energizing signals-ON timer has timed out, as determined at decision block 426, the energization signal will be cut off to disable the solenoid at block 428.

It will be appreciated that the microcontroller 31 may be programmed to repeat the subsequent energizing signals and signal-OFF cycles indefinitely, or until the activation signal to the microcontroller 31 is cut off.

Figure 5:
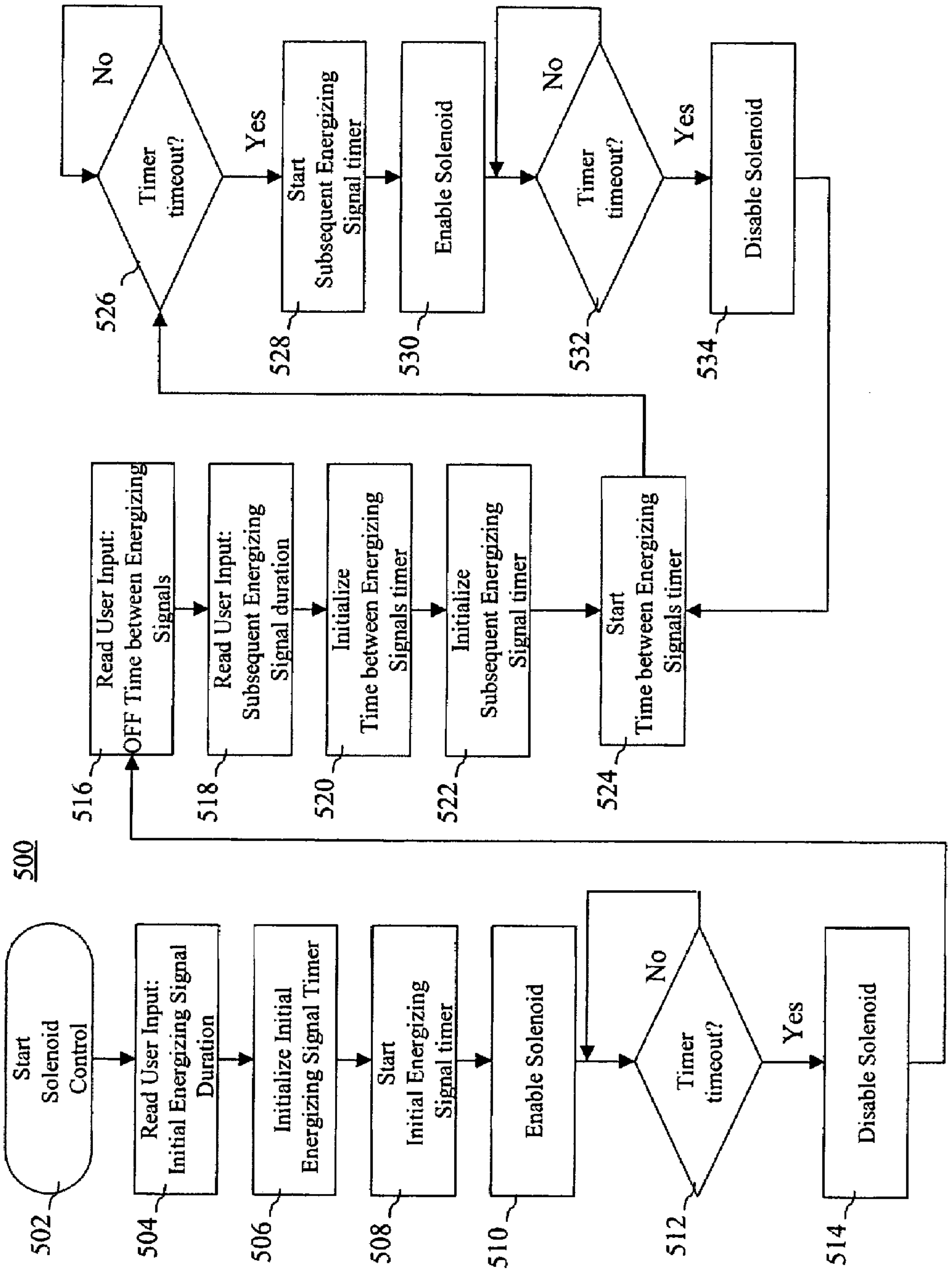
FIG. 5 depicts an alternative logic flow for a microcontroller to perform the timing and logic functions in accordance with an embodiment of the invention.

Referring now to FIG. 5, a flow chart representation of an exemplary algorithm 500 in which the duration of the initial and subsequent energization signals, as well as the duration of the OFF time between signals, is defined in the field at start-up (as implemented, for example, by the programmable microcontroller 31 of FIG. 3) is shown.

The microcontroller starts the solenoid control algorithm at block 502 when the activation signal is provided to the microcontroller. The microcontroller first reads the user input defining the initial energizing signal duration at block 504. Next, the microcontroller initializes and starts an initial energizing signal timer at blocks 506 and 508, respectively, and provides an energizing signal output to enable the solenoid at block 510. The output energization signal will be maintained until the initial energizing signal timer has timed out. If the initial energizing timer has timed out as reflected in decision block 512, the energization signal will be cut off to disable the solenoid at block 514.

The microcontroller will then read the user inputs defining both the duration signal-OFF periods, and the duration of the subsequent energizing signals at blocks 516 and 518, respectively. The microcontroller then initializes both an energizing signal-OFF timer (block 520) and a timer for subsequent energizing signals-ON (block 522).

Next, the energizing signal-OFF timer is started at block 524 and the output energization signal is cut off until the energizing signal-OFF timer has timed out. If the microcontroller energizing signal-OFF timer has timed out, as determined at decision block 526, the subsequent energizing signals-ON is started at block 528 and the microcontroller provides an energizing signal output to re-enable the solenoid at block 530. If the microcontroller 31 subsequent energizing signals-ON timer has timed out as reflected at decision block 532, the energization signal will be cut off to disable the solenoid at block 534.

It will be appreciated that the microcontroller may be programmed to repeat the subsequent energizing signals and energizing signal-OFF cycles either for a specific number of cycles, or indefinitely (as shown), or until the activation signal to the microcontroller is cut off.

Figure 6:
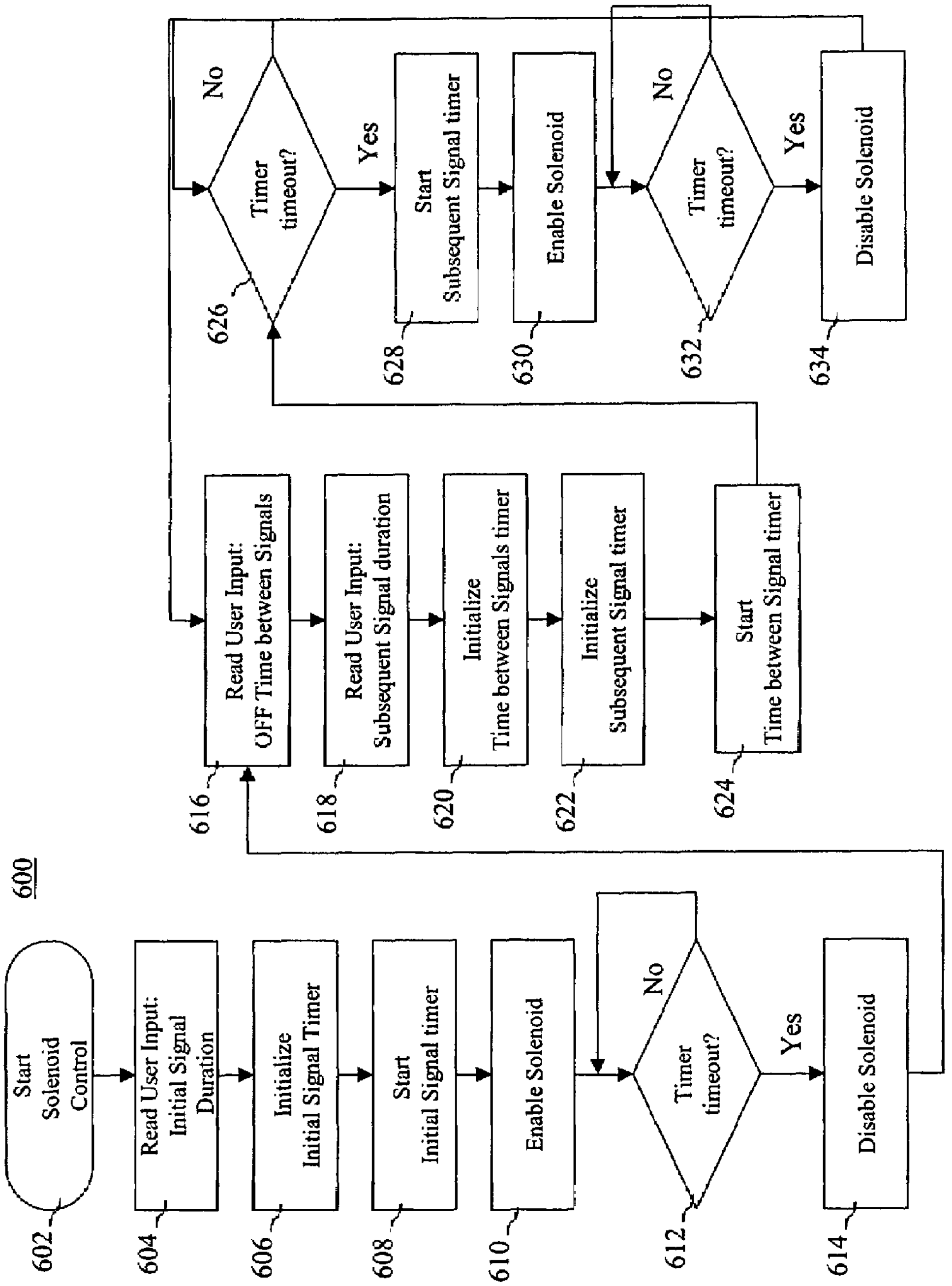
FIG. 6 depicts an alternative logic flow for a microcontroller to perform the timing and logic functions in accordance with an embodiment of the invention.

Referring now to FIG. 6, a flow chart representation of an exemplary algorithm 600 in which the duration of the initial and subsequent energization signals as well as the duration of the OFF time between signals is defined at any time and is adjustable while operating in the field (as implemented, for example, by the programmable microcontroller 31 of FIG. 3) is shown.

The microcontroller starts the solenoid control algorithm 600 at block 602 when the activation signal is provided to the microcontroller. The microcontroller first reads the user input defining the initial energizing signal duration at block 604. Next, the microcontroller initializes and starts an initial energizing signal timer at blocks 606 and 608, respectively, and provides an energizing signal output to enable the solenoid at block 610. The output energization signal will be maintained until the initial energizing signal timer has timed out. If the initial energizing timer has timed out as reflected at decision block 612, the energization signal will be cut off to disable the solenoid at block 614.

The microcontroller will then read the user inputs defining both the duration of the energization signal-OFF periods, and the duration of the subsequent energizing signals at blocks 616 and 618, respectively. The microcontroller then initializes both an energizing signal-OFF timer at block 620 and a timer for subsequent energizing signals-ON at block 622.

Next, the energizing signal-OFF timer is started at block 624 and the output energization signal is cut off until the energizing signal-OFF timer has timed out. If the microcontroller energizing signal-OFF timer has timed out as reflected at decision block 626, the subsequent energizing signals-ON timer is started at block 628 and the microcontroller provides an energizing signal output to re-enable the solenoid at block 630. If the microcontroller subsequent energizing signals-ON timer has timed out as reflected at block 632, the energization signal will be cut off to disable the solenoid at block.

Next, the microcontroller will return to block 616 and then re-read the user inputs defining both the duration of the energization signal-OFF periods, and the duration of the subsequent energizing signals (block 618). The microcontroller then re-initializes both an energizing signal-OFF timer and a timer for subsequent energizing signals-ON (blocks 620, 622).

It will be appreciated that the microcontroller may be programmed to repeat the subsequent energizing signal-ON and energizing signal-OFF cycles as described above either for a specific number of cycles or indefinitely, or until the activation signal to the microcontroller is cut off.

Figure 8:
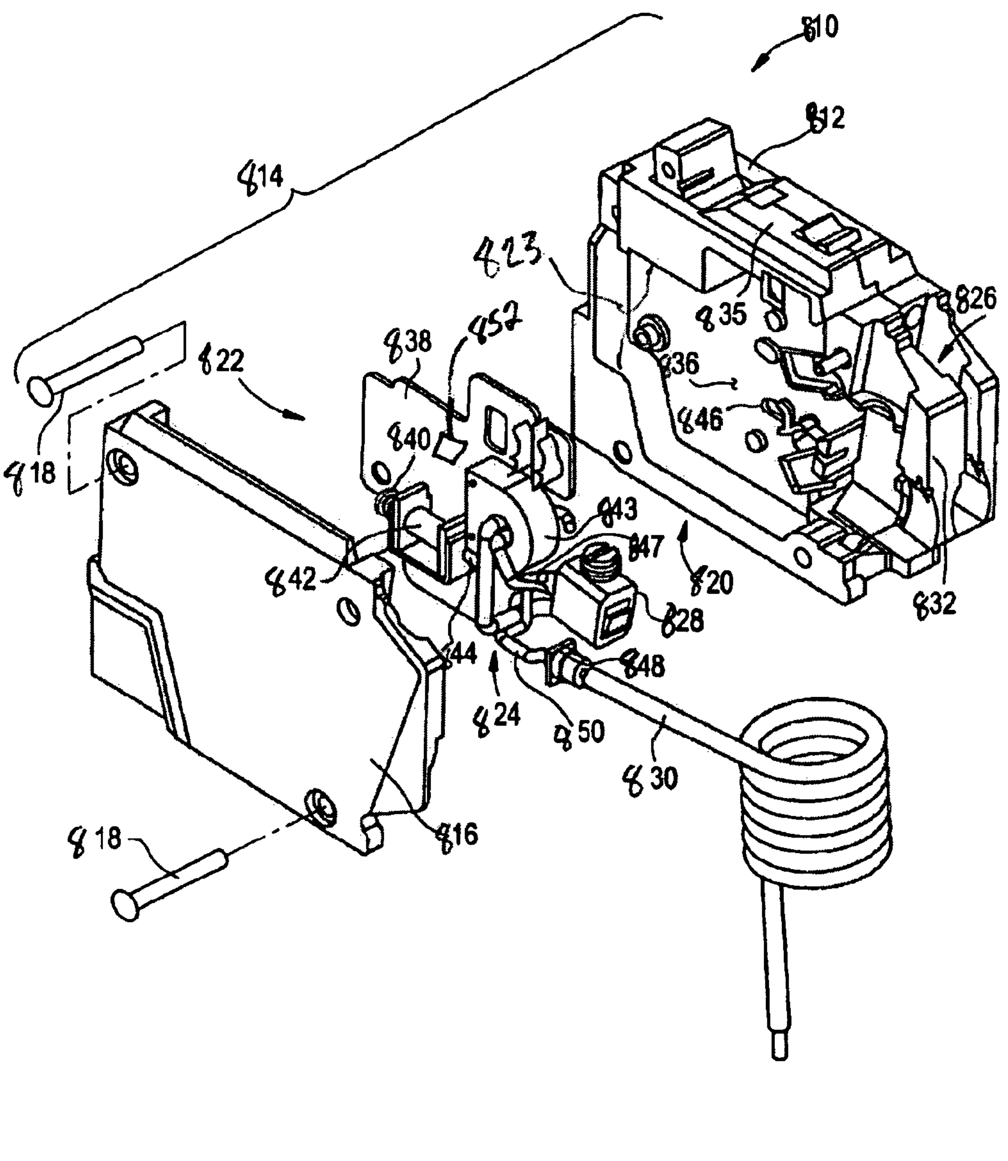
FIG. 8 depicts an exploded view of a circuit breaker comprising a controller circuit in accordance with another embodiment of the invention.

Referring to FIG. 8, an arc fault type circuit breaker incorporating a solenoid control circuit in accordance with another embodiment of the present invention is shown at 810. Circuit breaker 810 comprises a first housing 812, a second housing 814, and a cover 816 that are assembled securely together with a plurality of rivets or other tamper resistant fasteners 818. First housing 812 defines a mechanical compartment 823, having load current carrying and switching components disposed therein (collectively referred to herein as a mechanical sub-assembly), as is well known. Second housing 814 defines an electronics compartment 820, having current sensing components 822 and neutral current carrying components 824 disposed therein (collectively, the current sensing components 822 and the neutral current carrying components 824 are referred to herein as an electronics sub-assembly 825). A load current from a source (not shown) is connected to a line connection and conducted through current carrying and switching components in the mechanical compartment to a load lug 826 for connection to a load (not shown). A neutral current from the load connects to neutral lug 828, and conducts along the neutral current carrying components 824 to neutral return wire 830 for customer connection to the source. Arc faults are sensed and processed by sensing components 822.

The mechanical compartment 823 may be similar to that described in U.S. Pat. Nos. 5,818,671 and 6,255,923 and reference may be had thereto for a detailed description thereof.

Current sensing components 822 include a circuit board 838 which is electrically connected to a solenoid 840 and a current sensing transformer 843. Upon receiving signals indicative of an arc fault, circuit board 838 provides a trip signal to trip the arc fault circuit breaker 810.

Also referring to FIG. 8, solenoid 840 has a plunger shaft 842 with a right angle plunger arm 844 (FIG. 6) depending therefrom. As is known, plunger arm 834 provides the means to trip the circuit breaker 810 under arc fault conditions. The plunger arm 834 extends into the mechanical compartment through a slot 846 inside wall 836. That is when an arc fault is sensed, circuit board 838 generates a trip signal to actuate solenoid 840, which (via plunger shaft 842) causes the plunger arm 834 to act which, in turn, actuates contacts in the mechanical compartment 823 to open the load current path.

The neutral current carrying components 824 within the electronics compartment 820 are electrically connected, e.g., welded, bolted, or crimped, to form a neutral current path for the neutral current. The neutral current path begins at neutral lug 828 where the neutral current enters the electronics compartment 820. Neutral lug 828 secures the neutral lead connected to the load against neutral terminal which is connected to a conductor 847 to provide electrical continuity thereto. The neutral terminal is electrically connected to neutral return wire 830 via a connection 848 and conductor 850. Both conductors 850 and 847 (the neutral current path and the load current path, respectively) are routed through the current sensing transformer 843 to sense arcing from line to ground as is well known. This is accomplished by routing the flow of the neutral current through the sensing transformer 843 in the opposite direction to the flow of the load current. The total current flow through sensing transformer 843 thus cancels unless an external ground fault current is caused by arcing from line to ground. The resulting differential signal, sensed by sensing transformer 843, is indicative of the ground fault current and is processed by circuit board 838, in a known manner.

The circuit breaker 810 further comprises a control circuit 852 that may be located on the circuit board 838, or optionally remotely therefrom where multiple circuit breakers are contemplated, and is connected in circuit with the solenoid 840. The solenoid control circuit 852 may be similar to the control circuit 5, described above, and is configured to operate the solenoid 840 in response to an activation or trip signal (such as activation signal 14' or trip signal 14 described above), to provide a first energizing signal to the solenoid for a first predetermined period of time and, thereafter, to cut off the first energizing signal. After a second predetermined period of time, the circuit 802 is further configured to provide a second energizing signal to the solenoid 840 for a third predetermined period of time. In this way, the energizing signals to the electromechanical solenoid are intermittent and thus not maintained for an extended period thereby preventing excessive heat to develop in the solenoid.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An apparatus for controlling the operation of a solenoid in a circuit breaker, said apparatus comprising:

a trip unit operative to issue a first activation signal in response to a first predetermined condition;

a solenoid having a first predetermined energization current level, said solenoid configured to continuously conduct a second level of current, said second current level being less than said first predetermined energization current level;

a control circuit configured to receive said activation signal; and wherein said control circuit is further configured to provide a first energizing signal to said solenoid for a first predetermined period of time and to thereafter cut off said first energizing signal for a second predetermined period of time; and to thereafter provide a second energizing signal to said solenoid for a third predetermined period of time, all in response to said activation signal.

2. The Apparatus of claim 1, further comprising a power supply having one side electrically connected to one terminal of the solenoid.

3. A control system for a circuit breaker, said control system comprising:

a switch operative to issue a first activation signal;

a control circuit configured to receive said first activation signal;

a solenoid having a first predetermined energization current level, said solenoid configured to continuously conduct a second level of current, said second current level being less than said first predetermined energization current level; and wherein said control circuit is further configured to provide a first energizing signal to said solenoid for a first predetermined period of time, and to thereafter cut off said first energizing signal for a second predetermined period of time; and to thereafter provide a second energizing signal to said solenoid for a third predetermined period of time, all in response to said activation signal.

4. The apparatus of claim 1, wherein said control circuit is configured to enable any one of an adjustment of the duration of the said first energizing signal, a duration of said second predetermined period, and a duration of said second energizing signal.

5. The control system of claim 3, wherein said control circuit includes a switching device configured to cut off said first energizing signal for said second predetermined period; and said switching device is further configured to provide said second energizing signal to said solenoid for said third predetermined period.

6. The apparatus of claim 1, wherein said control circuit includes a switching device;

said control circuit further comprising a timer in electrical communication with said switching device; and wherein said timer is configured to trigger said switching device to provide said first energizing signal to said solenoid for said first predetermined period, and to shut off said switching device to cut off said first energizing signal to said solenoid for said second predetermined period.

and to trigger said switching device to provide said second energizing signal to said solenoid for said third predetermined period, all in response to said activation signal.

7. The control system of claim 3, wherein said control circuit comprises a switching device;

said control circuit further comprising a timer in electrical communication with said switching device; and wherein said timer is configured to trigger said switching device to provide said first energizing signal to said solenoid for said first predetermined period, and to shut off said switching device to cut off said first energizing signal to said solenoid for said second predetermined period, and to trigger said switching device to provide said second energizing signal to said solenoid for said third predetermined period, all in response to said activation signal.

8. The apparatus of claim 6, wherein said timer is configured to enable adjustment of the duration of said first energizing signal, the duration of said second predetermined period, and the duration of said second energizing signal.

9. The control system of claim 7, wherein said timer is configured to enable adjustment of the duration of said first energizing signal, the duration of said second predetermined period, and the duration of said second energizing signal.

10. The apparatus of claim 1, wherein said control circuit includes a microcontroller;

wherein said microcontroller further comprises a timer in electrical communication with a switching device; and wherein said microcontroller is configured to trigger said switching device to provide said first energizing signal to said solenoid for said first predetermined period, and to shut off said switching device to cut off said first energizing signal to said solenoid for said second predetermined period, and to trigger said switching device to provide said second energizing signal to said solenoid for said third predetermined period, all in response to said activation signal.

11. The control system of claim 3, wherein said control circuit includes a microcontroller;

wherein said microcontroller further comprises a timer in electrical communication with a switching device; and wherein said microcontroller is configured to trigger said switching device to provide said first energizing signal to said solenoid for said first predetermined period, and to shut off said switching device to cut off said first energizing signal to said solenoid for said second predetermined period, and to trigger said switching device to provide said second energizing signal to said solenoid for said third predetermined period, all in response to said activation signal.

12. The apparatus of claim 10, wherein said control circuit is configured to enable adjustment of the duration of the said first energizing signal, the duration of said second predetermined period, and the duration of said second energizing signal.

13. The control system of claim 11, wherein said control circuit is configured to enable adjustment of the duration of the said first energizing signal, the duration of said second predetermined period, and the duration of said second energizing signal.

14. A method for controlling the operation of a solenoid having a first predetermined energization current level, in a circuit breaker having circuit interrupting contacts whose separation is initiated by energizing of the solenoid, the method comprising:

providing a second level of current to said solenoid, said second current level being less than said first predetermined energization current level;

sensing an activation signal indicative of a predetermined condition;

providing a first energizing signal to said solenoid;

cutting off said first solenoid energizing signal after a first predetermined period of time, for a second predetermined period of time;

providing a second solenoid activation signal to said solenoid after said second predetermined period; and maintaining said second solenoid activation signal for a third predetermined period.

15. The method of claim 14, further comprising adjusting the duration of said first energizing signal, the duration of said second predetermined period, and the duration of said second energizing signal.

16. The method of claim 14, further comprising adjusting any of said duration periods independently of the other said duration periods.

* * * * *

UNITED STATES PATENT AND TRADEMARK OFFICE
CERTIFICATE OF CORRECTION

PATENT NO. : 7,692,903 B2
APPLICATION NO. : 11/961608
DATED : April 6, 2010
INVENTOR(S) : Dwyer et al.

It is certified that error appears in the above-identified patent and that said Letters Patent is hereby corrected as shown below:

In Column 7, Line 28, delete "Q" and insert -- Q1 --, therefor.

In Column 7, Line 64, delete "a stable" and insert -- astable --, therefor.

In Column 13, Line 25, in Claim 6, delete "period." and insert -- period, --, therefor.

Signed and Sealed this

Twenty-fourth Day of August, 2010

David J. Kappos

*Director of the United States Patent and Trademark Office*